(12) United States Patent
Han et al.

(10) Patent No.: US 10,411,828 B2
(45) Date of Patent: Sep. 10, 2019

(54) METHODS, SYSTEMS, AND DEVICES FOR MODULATION AND CODING SCHEME SIGNALING FOR COMMON CONTROL CHANNEL

(71) Applicant: Intel IP Corporation, Santa Clara, CA (US)

(72) Inventors: Seunghee Han, Cupertino, CA (US); Hwan-Joon Kwon, Santa Clara, CA (US); Alexei Davydov, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 368 days.

(21) Appl. No.: 14/581,619

(22) Filed: Dec. 23, 2014

(65) Prior Publication Data

US 2015/0271006 A1   Sep. 24, 2015

Related U.S. Application Data

(60) Provisional application No. 61/968,283, filed on Mar. 20, 2014.

(51) Int. Cl.
*H04L 1/00* (2006.01)
*H04L 27/00* (2006.01)
*H04L 27/36* (2006.01)

(52) U.S. Cl.
CPC ............ *H04L 1/001* (2013.01); *H04L 1/0016* (2013.01); *H04L 1/0025* (2013.01);
(Continued)

(58) Field of Classification Search
CPC ..... H04L 1/0001; H04L 27/34; H04L 5/0005; H04W 72/042; H04W 72/046
See application file for complete search history.

(56) References Cited

U.S. PATENT DOCUMENTS

2010/0075691 A1   3/2010   Cai et al.
2010/0238823 A1*  9/2010   Chen ............... H04L 1/1822
                                              370/252
(Continued)

FOREIGN PATENT DOCUMENTS

CN   102422581 A   4/2012
CN   103580788 A   2/2014
(Continued)

OTHER PUBLICATIONS

International Search Report and Written Opinion dated Sep. 24, 2015 from International Application No. PCT/US2015/016643.
(Continued)

*Primary Examiner* — Un C Cho
*Assistant Examiner* — Peter K Mak
(74) *Attorney, Agent, or Firm* — Schwabe, Williamson & Wyatt, P.C.

(57) ABSTRACT

Embodiments of the present disclosure describe methods, systems, and devices for modulation and coding scheme signaling for a common control channel. Various embodiments may include restricting transmit block size selection for downlink control information format 1A having a cyclic-redundancy check scrambled by a paging radio network temporary identifier, a system information radio network temporary identifier, or a random access radio network temporary identifier. Other embodiments may be described or claimed.

13 Claims, 4 Drawing Sheets

(52) U.S. Cl.
CPC .......... *H04L 1/0039* (2013.01); *H04L 1/0061* (2013.01); *H04L 27/0012* (2013.01); *H04L 27/362* (2013.01); *H04L 2001/0093* (2013.01)

(56) References Cited

U.S. PATENT DOCUMENTS

| | | | | |
|---|---|---|---|---|
| 2010/0323709 | A1* | 12/2010 | Nam | H04L 5/0094 455/450 |
| 2011/0239072 | A1* | 9/2011 | Cai | H04L 1/1896 714/748 |
| 2013/0223376 | A1 | 8/2013 | Seong et al. | |
| 2014/0169297 | A1* | 6/2014 | Kim | H04L 5/0092 370/329 |
| 2014/0301306 | A1* | 10/2014 | Kim | H04L 5/0046 370/329 |
| 2015/0215913 | A1* | 7/2015 | Cheng | H04L 1/0001 370/330 |

FOREIGN PATENT DOCUMENTS

| | | | | |
|---|---|---|---|---|
| EP | 2166735 | A1 * | 3/2010 | ....... H04L 29/12839 |
| JP | 2012521163 | A | 9/2012 | |
| TW | 201126986 | A | 8/2011 | |
| TW | 201334614 | A | 8/2013 | |
| TW | 201406180 | A | 2/2014 | |

OTHER PUBLICATIONS

Sony, "SIB delivery for low-complexity MTC UE," 3GPP TSG RAN WG1 #74bis, R1-134484, Agenda Item: 7.2.2, Oct. 7-11, 2013, Guangzhou, China, 4 pages.

Huawei et al., "Standard impacts to support higher order modulation," 3GPP TSG RAN WG1 Meeting #73, R1-131853, Agenda Item: 6.2.5.1.2, May 20-24, 2013, Fukuoka, Japan, 2 pages.

HTC, "On Small Cell Enhancement for Improved Spectral Efficiency," 3GPP TSG RAN WG1 Meeting #72, R1-130311, Agenda item: 7.3.5.2, Jan. 28-Feb. 1, 2013, St Julian's, Malta, 4 pages.

MOTOROLA, "TBS and MCS Table Generation and Signaling for E-UTRA," 3GPP TSG RAN1 #51bis, R1-080072, Agenda Item: 61.3, Jan. 14-18, 2008, Seville, Spain, 5 pages.

3GPP, "Evolved Universal Terrestrial Radio Access (E-UTRA); Physical layer procedures (Release 12)," 3GPP TS 36.213 V12.0.0 (Dec. 2013), Lte Advanced, Dec. 20, 2013, 115 pages.

Office Action dated May 19, 2016 from Taiwan Patent Application No. 104104562, 19 pages.

Notice of Preliminary Rejection dated Aug. 21, 2017 from Korean Patent Application No. 10-2016-702246, 14 pages.

Extended European Search Report dated Oct. 13, 2017 from European Patent Application No. 15765299.1, 16 pages.

Office Action dated Oct. 24, 2017 from Japanese Patent Application No. 2016-552517, 5 pages.

Panasonic, "MCS Indication for 256QAM," 3GPP TSG-RAN WG1 Meeting 76, R1-140502, Agenda Item: 7.2.4.1, Feb. 10-14, 2014, Prague, Czech Republic, 6 pages.

3GPP, "Evolved Universal Terrestrial Radio Access (E-UTRA); Physical layer procedures (Release 12)," 3GPP TS 36.213 V12.1.0 (Mar. 2014), Lte Advanced, Mar. 19, 2014, pp. 43-55.

Huawei et al., "Discussion on I_MCS range for P/SI/RA-RNTI," 3GPP TSG RAN WG1 Meeting #78, R1-142824, Agenda Item: 7.2.1.1, Aug. 18-22, 2014, Dresden, Germany, 2 pages.

Intel Corporation, "Discussion on the remaining details of MCS/TBS table for 256QAM," 3GPP TSG RAN WG1 Meeting #77, R1-142012, Agenda Item: 6.2.3.1, May 19-23, 2014, Seoul, Korea, 6 pages.

Korean Patent Office—Notice of Preliminary Rejection issued xx 2018 from Korean Patent Application No. 10-2016-7022466, xx pages.

Office Action dated Feb. 26, 2018 from Taiwan Divisional Application No. 105138882, 23 pages.

Japanese Patent Office—Notice of Reasons for Rejection dated Jul. 10, 2018 from Japanese Patent Application No. 2016-552517, 6 pages.

QUALCOMM Incorporated, "Higher order modulation," 3GPP TSG RAN WG1 #76, R1-140451, Agenda item: 7.2.4.1, Feb. 10-14, 2014, Prague, Czech Republic, 6 pages.

Korean Patent Office—Notice of Final Rejection dated Sep. 6, 2018 from Korean Patent Application No. 10-2016-7022466, 7 pages.

* cited by examiner

METHODS, SYSTEMS, AND DEVICES FOR MODULATION AND CODING SCHEME SIGNALING FOR COMMON CONTROL CHANNEL

CROSS-REFERENCE TO RELATED APPLICATION

This application claims the benefit of U.S. Provisional Application No. 61/968,283 filed Mar. 20, 2014, entitled "MCS Signaling for Common Control Channel Configured with 256 QAM Modulation," the entirety of which is hereby incorporated by reference.

FIELD

Embodiments of the present disclosure generally relate to the field of wireless communication, and more particularly, to methods, systems, and devices for modulation and coding scheme signaling for common control channel.

BACKGROUND

A new modulation scheme of 256-quadrature amplitude modulation (256-QAM) is introduced for downlink transmissions in third generation partnership project (3GPP) long-term evolution (LTE) networks. This new modulation scheme may increase spectral efficiency as compared to incumbent modulation schemes such as quadrature phase shift keying (QPSK), 16-QAM, and 64-QAM, but may complicate interworking of legacy and advanced user equipments (UEs).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the term "or" is used as an inclusive term to mean at least one of the components coupled with the term. For example, the phrase "A or B" means (A), (B), or (A and B); and the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
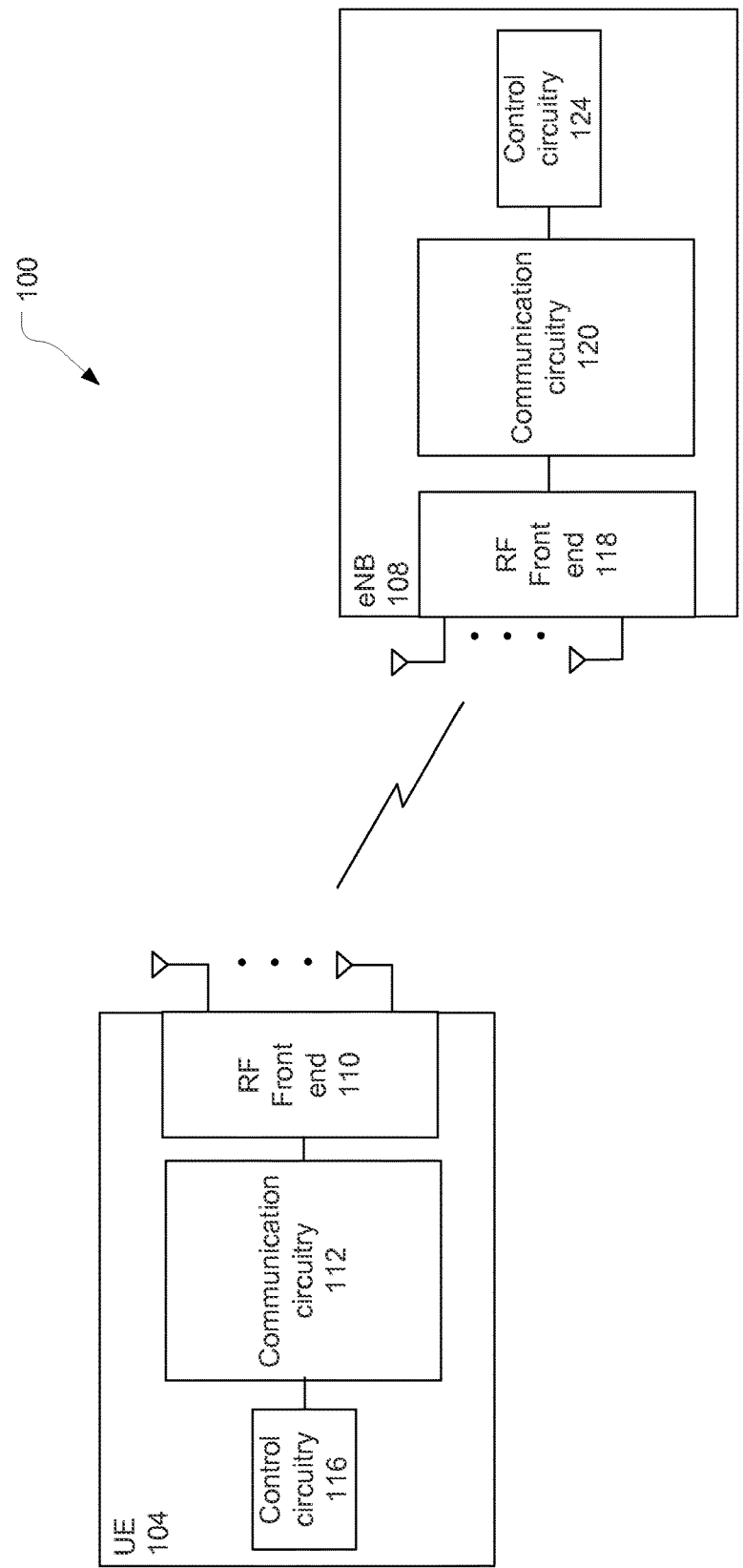
FIG. 1 schematically illustrates a wireless communication environment in accordance with various embodiments.

FIG. 1 schematically illustrates a wireless communication environment 100 in accordance with various embodiments. The environment 100 may include a user equipment (UE) 104 in wireless communication with an evolved node B (eNB) 108. The eNB 108 may be an access node of an evolved universal terrestrial radio access network (EUTRAN) of a $3^{rd}$ Generation Partnership Project (3GPP) Long-Term Evolution (LTE) or Long-Term Evolution Advanced (LTE-A) network. The eNB 108 may provide a radio cell that may be used by the UE 104 to wirelessly communicate with the EUTRAN and other nodes, for example, nodes of an evolved packet core (EPC) that is coupled with the EUTRAN.

The UE 104 may include a radio frequency (RF) front end 110, communication circuitry 112, and control circuitry 116 coupled with each other as shown. The RF front end 110 may facilitate wireless communication with the eNB 108 by providing and maintaining a wireless connection with the eNB 108. The RF front end 110 may perform various front-end RF processing operations to facilitate transfer of RF signals over the wireless connection. These front-end RF processing operations may include, but are not limited to, filtering, converting, amplifying, etc.

The communication circuitry 112 may receive RF signals from, and provide RF signals to, the RF front end 110. The communication circuitry 112 may provide various access stratum (AS) processing operations to manage radio resources and transport data over the wireless connection. The AS processing operations may include, but are not limited to, radio resource control (RRC) operations, packet data convergence protocol (PDCP) operations, radio link control (RLC) operations, medium access control (MAC) operations, physical (PHY) layer operations, etc.

The control circuitry 116 may interface with the communication circuitry 112 to exchange data and control signals. The control circuitry 116 may provide various non-access stratum (NAS) processing operations such as, but not limited to, performing authentication operations, security control operations, paging operations, etc. In some embodiments, the control circuitry 116 may additionally or alternatively provide other higher layer operations such as, but not limited to, Internet protocol (IP) operations, transport operations, application operations, etc.

The eNB 108 may include RF front end 118, communication circuitry 120, and control circuitry 124 coupled with one another. The RF front end 118, communication circuitry 120, and control circuitry 124 may generally perform operations similar to those described above with respect to RF front end 110, communication circuitry 112, and control circuitry 116, respectively. However, in some embodiments, some or all of the NAS operations of the control circuitry 116 may be performed in control circuitry of an EPC node, rather than the eNB 108.

The UE 104 and the eNB 108 may communicate with one another using EUTRAN physical channels and signals. For example, physical channels in the downlink may include: a physical downlink control channel (PDCCH) that carries downlink allocation information and uplink allocation grants for the UE 104; a physical control format indicator channel (PCFICH) used to signal the length of the PDCCH; a physical hybrid automatic repeat request indicator channel (PHICH) used to carry acknowledgments from the uplink transmissions; a physical downlink shared channel (PDSCH) used to carry data in transport blocks; a physical multicast channel (PMCH) used for broadcast transmission using a single frequency network; and a physical broadcast channel (PBCH) used to broadcast the basic system information within the cell. Various synchronization and reference signals may also be transmitted in the downlink.

Traditionally, supported modulation schemes on the PDSCH include QPSK, 16-QAM, and 64-QAM. However, as mentioned above, later 3GPP releases describe the use of 256-QAM. As will be understood, 256-QAM refers to a digital modulation scheme in which a constellation diagram includes 256 points. The addition of this modulation scheme may complicate interoperation of advanced and legacy UEs.

Physical channels in the uplink may include: a physical random access channel (PRACH) used for initial access and when the UE 104 loses its uplink synchronization, for example; a physical uplink shared channel (PUSCH) used to carry uplink transport data together with control information, for example; and physical uplink control channel (PUCCH) used to carry control information, for example.

Radio network temporary identifiers (RNTIs) may be used in the EUTRAN to identify one specific radio channel from another radio channel or one user from another user. There may be a number of different types of RNTIs used for specific purposes. For example, a paging RNTI (P-RNTI) may be used for paging messages, a system information RNTI (SI-RNTI) may be used for system information block (SIB) messages; random-access RNTI (RA-RNTI) may be used for random access response; cell RNTI (C-RNTI) may be used for transmission to a specific UE; temporary C-RNTI (T-CRNTI) may be used during random access procedure; a semi-persistent scheduling C-RNTI (SPS-C-RNTI); transmit power control (TPC)-PUCCH-RNTI; TPC-PDSCH-RNTI; and a multimedia broadcast multicast service (M)-RNTI.

These RNTIs may be used to scramble a cyclic redundancy check (CRC) part of radio channel messages. Therefore, only a UE that knows the correct RNTI will be able to descramble and coherently process the received radio channel messages. In general, a MAC or Layer 1 controller, within the communication circuitry 112 of the UE 104, may instruct the PHY of the communication circuitry 112 as to which RNTI to use to decode a radio channel message. The MAC/L1 controller may determine the proper RNTI based on context information. For example, if the PHY is to decode a subframe that carries SIB, the MAC/L1 controller may instruct the PHY to descramble the message using SI-RNTI.

In processing the downlink channel, the UE 104 may first determine the PDSCH modulation scheme used and a transport block size (TBS). This information may be derived, directly or indirectly, from the PDCCH downlink control information (DCI), which transports downlink or uplink scheduling information. In some embodiments, the DCI may specify a five-bit modulation and coding scheme (MCS) index, $I_{MCS}$, that the UE 104 may use to reference a stored MCS table. However, if the CRC of the DCI has been scrambled with a P-RNTI, RA-RNTI, or SI-RNTI, then the stored MCS table may not be applicable. In such case, the modulation scheme may be fixed as QPSK, which may be the modulation scheme that is always used when transferring paging messages, system information, and random access responses; and a TBS index may be set equal to the MCS index. The TBS determination may then be dependent on the combination of TBS index and column $N_{PRB}$ of Table 1 where the most significant bit (MSB) of transmit power control (TPC) command in DCI is reserved and least significant bit (LSB) of TPC command indicates column $N_{PRB}$ ($N_{PRB}=2$ if LSB=0; $N_{PRB}=3$ otherwise). If the DCI is for DCI format 1A, the TBS may be selected from Table 1 below using the TBS index and $N_{PRB}$. When format 1A CRC is scrambled with C-RNTI, the DCI format 1A may be used for downlink resource allocation DCI to provide compact scheduling of a PDSCH or random access procedure initiated by a PDCCH order.

TABLE 1

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 586 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |

TABLE 1-continued

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

If the least significant bit of a two-bit TPC command within the DCI with DCI format 1A for PUCCH is 0, then $N_{PRB}^{1A}=2$, else $N_{PRB}^{1A}=3$, when the format 1A CRC is scrambled by RA-RNTI, P-RNTI, or SI-RNTI. The UE 104 may then set the column indicator, $N_{PRB}$, to $N_{PRB}^{1A}$. Thus, only the columns for $N_{PRB}=2$ and $N_{PRB}=3$ may be used for PDSCH referenced by DCI having its CRC scrambled by SI-RNTI, RA-RNTI, or P-RNTI (SI/RA/P-RNTI).

Although $I_{TBS}$ is signaled with a five-bit indicator associated with 32 values, Table 1 only provides 27 rows (0 to 26). Therefore, $I_{TBS}$=27, 28, 29, 30, and 31 may not be used for PDSCH referenced by DCI having its CRC scrambled by SI/RA/P-RNTI in legacy systems.

Additional rows may be added to a TBS table to support 256-QAM. For example, Table 2 is shown with additional rows 27-31. The values shown in rows 27-31 are not limiting. Other embodiments may include other values and other numbers of rows.

TABLE 2

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 586 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 27 | 648 | 1320 | 1992 | 2664 | 3368 | 4008 | 4584 | 5352 | 5992 | 6712 |
| 28 | 696 | 1416 | 2152 | 2856 | 3624 | 4264 | 4968 | 5736 | 6456 | 7224 |
| 29 | 744 | 1480 | 2280 | 2984 | 3752 | 4584 | 5352 | 5992 | 6712 | 7480 |
| 30 | 776 | 1608 | 2408 | 3240 | 4008 | 4776 | 5736 | 6456 | 7224 | 7992 |
| 31 | 840 | 1672 | 2536 | 3368 | 4264 | 5160 | 5992 | 6712 | 7736 | 8504 |

If the UE 104 is an advanced UE, configured with 256-QAM, and $I_{MCS}$ is signaled via DCI with its CRC scrambled by SI/RA/P-RNTI and if $N_{PRB}$=2, the UE 104 may derive the TBS to be 1672; however, a legacy UE may not be able to be recognized the additional TBS indices 27-31 since they did not exist in legacy systems. Since PDSCH referenced by DCI with its CRC scrambled by SI/RA/P-RNTI may be a common channel for multiple UEs, possibly including both legacy UEs (those not configured with 256-QAM) and advanced UEs (those configured with 256-QAM), this case would not be desirable since only the advanced UEs can recognize the DCI.

In some embodiments, to address the above-mentioned concerns, the values of $I_{MCS}$ greater than 26, for example, $I_{MCS}$=27, 28, 29, 30, and 31, may not be available for DCI format 1A having its CRC scrambled by SI/RA/P-RNTI. In such a case, if the UE 104 detects $I_{MCS}$=27, 28, 29, 30, or 31, the UE 104 may regard the DCI as inconsistent and discard the DCI contents and, thus, there will be no soft buffer combining in HARQ buffer. In some embodiments, this constraint may be applied only for an advanced UE configured with 256-QAM.

In some embodiments, if the UE 104 detects $I_{MCS}$=27, 28, 29, 30, or 31 in DCI format 1A having its CRC scrambled by SI/RA/P-RNTI, the UE 104 may consider the case as an error case with the behavior being unspecified. Thus, the behavior may be the same as the inconsistent determination described above or maybe something else, for example, implementation specific.

Figure 2:
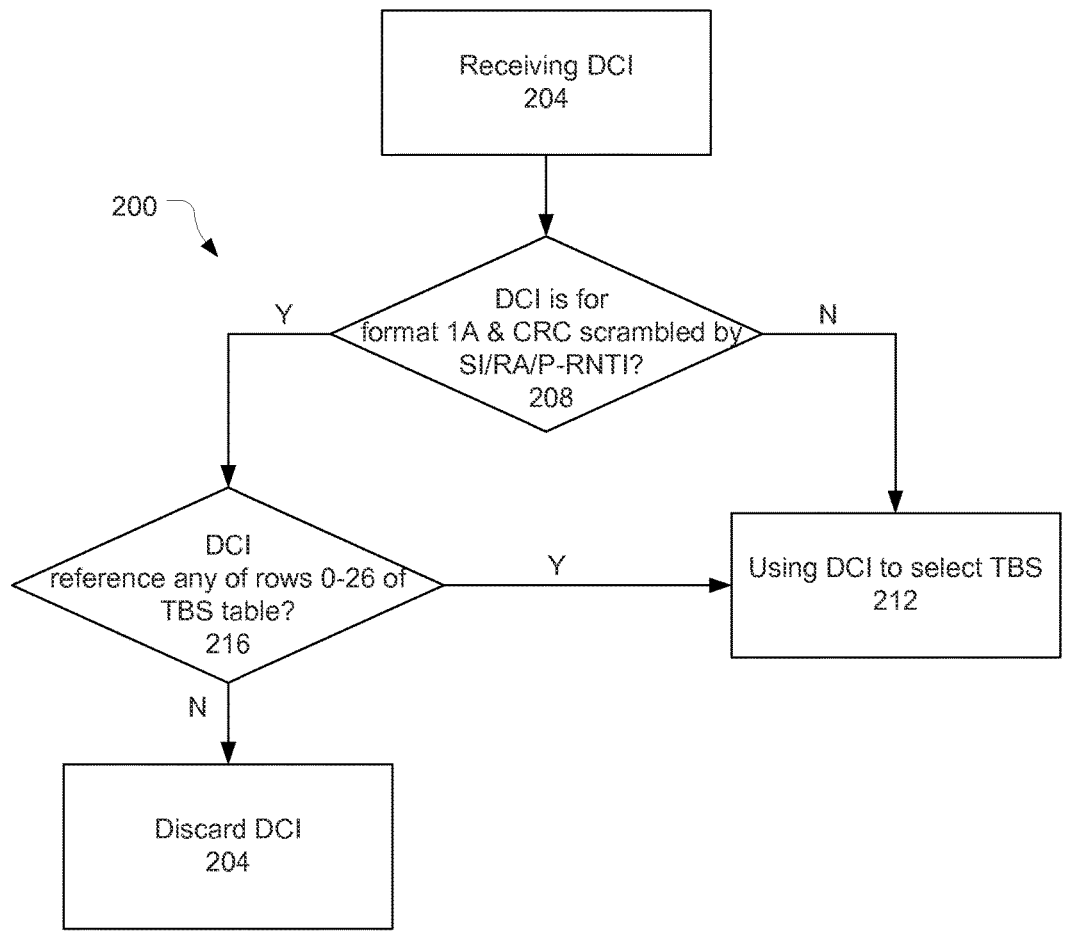
FIG. 2 is a flowchart illustrating a method of operating a user equipment (UE) in accordance with various embodiments.

FIG. 2 is a flowchart depicting a DCI processing operation 200 of the UE 104 in accordance with some embodiments. In some embodiments, the DCI processing operation 200 may be performed by the communication circuitry 112. In some embodiments, some or all of the DCI processing operation 200 may be performed by other components, for example, RF front end 110 or control circuitry 116. The UE 104 may have one or more non-transitory, computer readable media with instructions that, when executed, cause the UE 104 to perform some or all of the DCI processing operation 200.

The DCI processing operation 200 may include, at 204, receiving DCI. The DCI may be received by the UE 104 in a PDCCH transmission. In some embodiments, the communication circuitry 112 may receive the DCI from the RF front end 110.

The DCI processing operation 200 may include, at 208, determining whether the DCI is for DCI format 1A and CRC is to be scrambled by SI/RA/P-RNTI. The RNTI determination rules may be specified in 3GPP TS 36.321 v12.0.0 (2014-01-07).

The detection of DCI with an RNTI may be done by blind detection at the UE 104. At every trial of blind decoding of PDCCH (up to, for example, 44 times in a single configured component carrier), the UE 104 may try to descramble each RNTI. If a CRC turns out correct after descrambling, the PDCCH detection was successful.

If, at 208, it is determined that the DCI is not for DCI format 1A, or it is determined that the DCI is not scrambled by SI/RA/P-RNTI, the DCI processing operation 200 may advance to 212. At 212, the DCI processing operation 200 may include using the DCI to select a TBS. The selection of the TBS using the DCI may be performed similar to that described above with respect to Table 2. Following selection of the TBS, the UE 104 may decode a PDSCH, associated with the DCI, based on the selected TBS.

If, at 208, it is determined that the DCI is for DCI format 1A and CRC scrambled by SI/RA/P-RNTI, the DCI processing operation 200 may advance to 216. At 216, the DCI processing operation 200 may include determining whether the DCI references any of rows 0-26 of a TBS table stored at the UE 104. Determining which row the DCI references may be done similar to that described above. For example, the $I_{TBS}$ may be set to the five-bit $I_{MCS}$ value transmitted in the DCI and may be used to determine the row of the TBS table.

If, at 216, it is determined that the DCI references any of rows 0-26 of the TBS table, the DCI processing operation 200 may advance to 212, at which point the UE 104 may use the DCI to select the TBS and decode an associated PDSCH based on the TBS.

If, at 216, it is determined that the DCI does not reference any of the rows 0-26 of the TBS table, for example, the DCI references a row greater than 26, the DCI processing operation 200 may advance to 220. At 220, the DCI processing operation 200 may include discarding the DCI. The DCI may be discarded even though the referenced row is present in the TBS table. Since the DCI is discarded, the resource allocation for PDSCH may be considered not valid. Therefore, the UE 104 may not try to decode the PDSCH.

Figure 3:
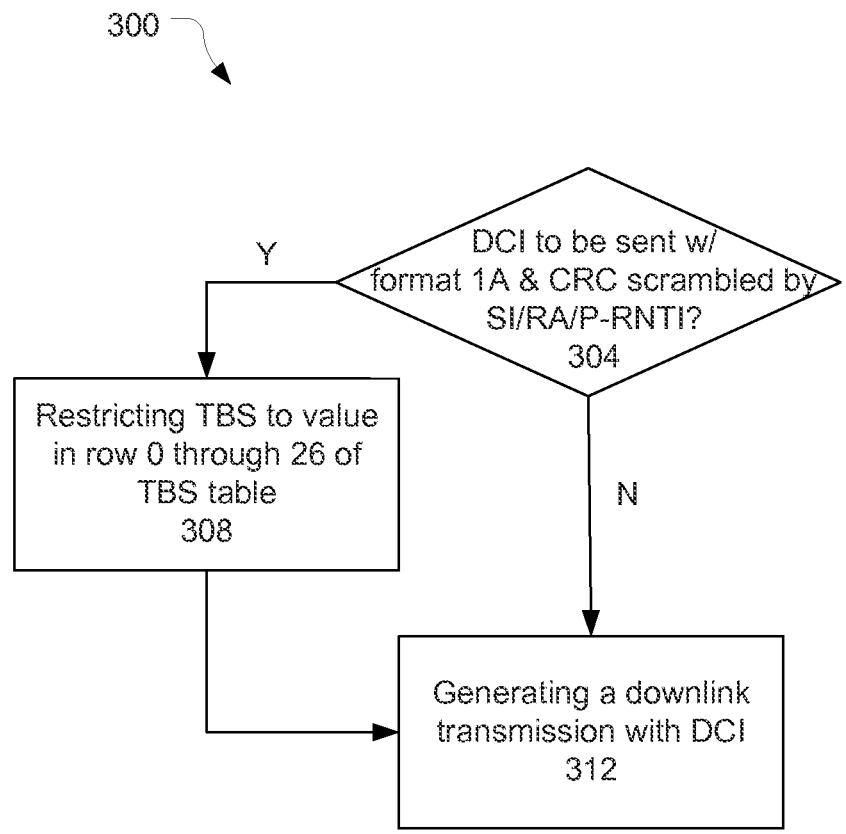
FIG. 3 is a flowchart illustrating a method of operating an evolved node B (eNB) in accordance with various embodiments.

FIG. 3 is a flowchart depicting a message generating operation 300 of the eNB 108 in accordance with some embodiments. In some embodiments, the message generating operation 300 may be performed by the communication circuitry 120. In some embodiments, some or all of the message generating operation 300 may be performed by other components, for example, RF front end 118 or control circuitry 124. The eNB 108 may have one or more non-transitory, computer-readable media with instructions that, when executed, cause the eNB 108 to perform some or all of the message generating operation 300.

The message generating operation 300 may include, at 304, determining whether the DCI is to be sent with DCI format 1A with the DCI CRC scrambled by SI/RA/P-RNTI. In some embodiments, this determining may be done by determining that a PDCCH transmission is to be sent allocating downlink resources of a PDSCH for paging, random access, or system information purposes.

If, is determined that DCI is to be sent with DCI format 1A with the DCI CRC scrambled by SI/RA/P-RNTI at 304, the message generating operation 300 may include, at 308, restricting a TBS to a value found in row 0-26 of a TBS table. This may be done by ensuring that $0 \le I_{MCS} \le 26$. Given that $I_{TBS}$ is set to $I_{MCS}$ for DCI format 1A with CRC scrambled by SI/RA/P-RNTI, the previous restriction would also ensure that $0 \le I_{TBS} \le 26$. As the PDSCH may be transmitted to more than one UE, and therefore, may include both legacy and advanced UEs, the restriction of the TBS values may facilitate interoperation of both legacy and advanced UEs.

From 304, message generating operation 300 may advance to 312, which includes generating a downlink transmission with the DCI. If the message generating operation 300 advances to 312 from 308, the downlink transmission may be generated with a DCI having an MCS index value restricted to be not more than 26 and a CRC scrambled by SI/RA/P-RNTI. The downlink transmission may be transmitted from the eNB 108 via the RF front end 118.

If, at 304, it is determined that the DCI is not to be sent with DCI format 1A or has a DCI CRC scrambled by an RNTI other than SI/RA/P-RNTI, for example, a C-RNTI, the message generating operation 300 may advance directly to 312. If the message generating operation 300 advances to 312 directly from 304 the downlink transmission may be generated with a DCI having an MCS index value that is unrestricted but for the field size of the MCS index, for example, five bits.

Figure 4:
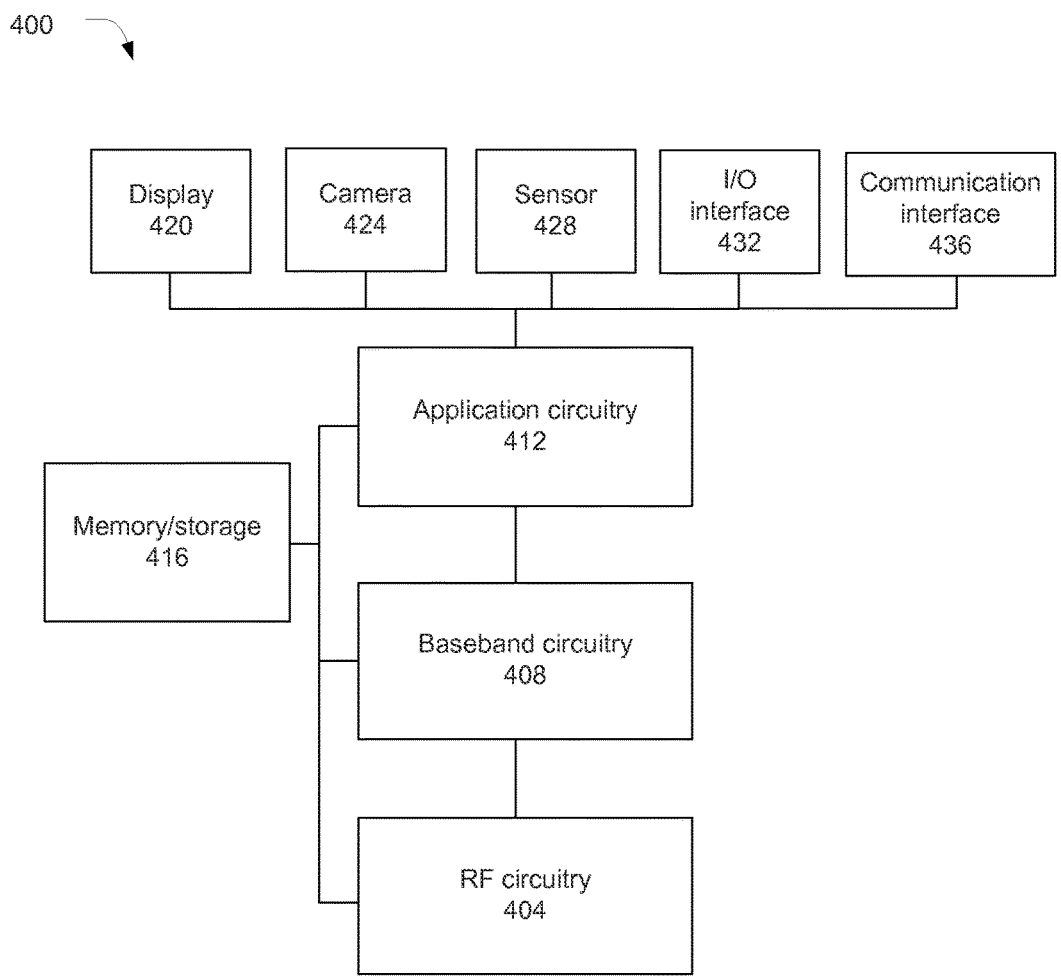
FIG. 4 is a block diagram of an example system that may be used to practice various embodiments described herein.

Embodiments described herein may be implemented into a system using any suitably configured hardware and/or software. FIG. 4 illustrates, for one embodiment, an example system comprising radio frequency (RF) circuitry 404, baseband circuitry 408, application circuitry 412, memory/storage 416, display 420, camera 424, sensor 428, input/output (I/O) interface 432, and a communication interface 436 coupled with each other at least as shown.

The application circuitry 412 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 416 and configured to execute instructions stored in the memory/storage to enable various applications and/or operating systems running on the system.

The baseband circuitry 408 may include circuitry such as, but not limited to, one or more single-core or multi-core processors. The processor(s) may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with EUTRAN and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, baseband circuitry 408 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

RF circuitry 404 may enable communication with wireless networks using modulated electromagnetic radiation through a non-solid medium. In various embodiments, the RF circuitry 404 may include switches, filters, amplifiers, etc. to facilitate the communication with the wireless network.

In various embodiments, RF circuitry 404 may include circuitry to operate with signals that are not strictly considered as being in a radio frequency. For example, in some embodiments, RF circuitry 404 may include circuitry to operate with signals having an intermediate frequency, which is between a baseband frequency and a radio frequency.

In some embodiments, some or all of the constituent components of the baseband circuitry, the application circuitry, and/or the memory/storage may be implemented together on a system on a chip (SOC).

In embodiments in which the system 400 is a UE, for example, UE 104, control circuitry 116 may be embodied in the application circuitry 412; communication circuitry 112 may be embodied in the baseband circuitry 408; and the RF front end 110 may be embodied in the RF circuitry 404. Various embodiments may include some variations in the architecture. For example, some or all of the control circuitry 116 may be implemented in the baseband circuitry 408, some or all of the communication circuitry 112 may be implemented in RF circuitry 404, etc.

In embodiments in which the system 400 is an eNB, for example, eNB 108, control circuitry 124 may be embodied in the application circuitry 412; communication circuitry 120 may be embodied in the baseband circuitry 408; and the RF front end 118 may be embodied in the RF circuitry 404. Various embodiments may include some variations in the architecture. For example, some or all of the control circuitry 124 may be implemented in the baseband circuitry 408, some or all of the communication circuitry 120 may be implemented in RF circuitry 404, etc.

Memory/storage 416 may be used to load and store data and/or instructions, for example, for system. Memory/storage 416 for one embodiment may include any combination of suitable volatile memory (e.g., dynamic random access memory (DRAM)) and/or non-volatile memory (e.g., Flash memory).

in various embodiments, the communication interface 436 may be an interface designed to facilitate communication with one or more wired networks, e.g., an Ethernet network. In some embodiments the communication interface 436 may be designed to communicate over coaxial, twisted-pair, or fiber-optic physical media interfaces.

In various embodiments, the I/O interface 432 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 428 may include one or more sensing devices to determine environmental conditions and/or location information related to the system. In some embodiments, the sensing devices may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 420 may include a display (e.g., a liquid crystal display, a touch screen display, etc.).

In various embodiments, the system 400 may be a mobile computing device such as, but not limited to, a laptop computing device, a tablet computing device, a netbook, an ultrabook, a smartphone, etc.; or an eNB. In various embodiments, system may have more or less components, and/or different architectures.

The following paragraphs describe examples of various embodiments.

Example 1 includes one or more non-transitory computer-readable media having instructions that, when executed, cause a user equipment (UE) to: process first downlink control information (DCI), received from an evolved node B (eNB), to determine a first transport block size (TBS) index that is greater than 26; select a TBS based on the first TBS index; use the TBS to process a first downlink transmission; process second DCI, received from the eNB with a DCI format 1A, to determine a second TBS index that is greater than 26, wherein a cyclic-redundancy check (CRC) that corresponds to the second DCI is scrambled by a paging radio network temporary identifier (P-RNTI), a system information radio network temporary identifier (SI-RNTI), or a random access radio network temporary identifier (RA-RNTI); and discard the second DCI based on the TBS index being greater than 26.

Example 2 includes the one or more non-transitory computer-readable media of example 1, wherein the instructions, when executed, cause the UE to: determine a modulation and coding scheme (MCS) index based on the second DCI; and set the second TBS index equal to the MCS index.

Example 3 includes the one or more non-transitory computer-readable media of any of examples 1-2, wherein the UE is configured to process a 256-quadrature amplitude modulation transmission.

Example 4 includes the one or more non-transitory, computer-readable media of any of examples 1-3, wherein the instructions, when executed, cause the UE to determine the TBS based on the first TBS index by reference to a stored table.

Example 5 includes the one or more non-transitory, computer-readable media of example 4, wherein the instructions, when executed, cause the UE to: set a column indicator equal to 2 if a least significant bit (LSB) of a transmit power control (TPC) command is 0 and set the column indicator equal to 3 if the LSB of the TPC command is not equal to zero; and determine the TBS based further on the column indicator.

Example 6 includes a user equipment (UE) comprising: a radio frequency (RF) front end to facilitate wireless communication with an evolved node B (eNB); and communication circuitry coupled with the RF front end to: receive, from the eNB via the RF front end, downlink control information (DCI) with a DCI format 1A that is scrambled by a paging radio network temporary identifier (P-RNTI), a system information radio network temporary identifier (SI-RNTI), or a random access radio network temporary identifier (RA-RNTI); determine the DCI references a row of a transport block size (TBS) table, the row being present in the TBS table and being greater than 26; and discard the DCI based on the row being greater than 26.

Example 7 includes the UE of example 6, wherein the DCI is first DCI, the row is a first row, and the communication circuitry is further to: receive, from the eNB via the RF front end, second DCI that is scrambled by a radio network temporary identifier (RNTI) other than a P-RNTI, SI-RNTI, or RA-RNTI; determine the second DCI references a second row of the TBS table, the second row being greater than 26; and utilize the DCI to determine a TBS based on the TBS table.

Example 8 includes the UE of example 7, wherein the communication circuitry is further to: process a physical downlink shared channel (PDSCH) transmission based on the TBS.

Example 9 includes the UE of example 8, wherein the communication circuitry is configured with 256-quadrature amplitude modulation.

Example 10 includes the UE of any of examples 6-9, wherein the communication circuitry is further to: determine a modulation and coding scheme (MCS) index based on the DCI; set a TBS index equal to the MCS index; and determine the row of the TBS table based on the TBS index.

Example 11 includes the UE of example 10, wherein the communication circuitry is further to: set a column indicator equal to 2 if a least significant bit (LSB) of a transmit power control (TPC) command is 0 and set the column indicator equal to 3 if the LSB of the TPC command is not equal to zero; and determine a column of the TBS table based on the column indicator.

Example 12 includes a method comprising: determining whether a cyclic-redundancy check (CRC) corresponding to downlink control information (DCI) is scrambled by a paging radio network temporary identifier (P-RNTI), a system information radio network temporary identifier (SI-RNTI), or a random access radio network temporary identifier (RA-RNTI); determining a row of a transmit block size (TBS) table referenced by the DCI; and determining whether to use the DCI or discard the DCI based on said determining of whether the CRC is scrambled by a P-RNTI, SI-RNTI, or RA-RNTI and said determining of the row of the TBS table referenced by the DCI.

Example 13 includes the method of example 12, wherein said determining whether to use the DCI or discard the DCI comprises: if the CRC is scrambled by P-RNTI, SI-RNTI, or RA-RNTI and the row is less than or equal to 26, using the DCI to select a TBS; and if the CRC is scrambled by P-RNTI, SI-RNTI, or RA-RNTI and the row is greater than 26, discarding the DCI.

Example 14 includes the method of any of examples 12-13, further comprising: determining a modulation and coding scheme (MCS) index based on the DCI; setting a TBS index equal to the MCS index; and determining the row of the TBS table based on the TBS index Example 15 includes the method of any of examples 12-14, further comprising: setting a column indicator equal to 2 if a least significant bit (LSB) of a transmit power control (TPC) command is 0 and setting the column indicator equal to 3 if the LSB of the TPC command is not equal to zero; and selecting a TBS from the row based on the column indicator.

Example 16 includes the method of example 15, further comprising: processing a physical downlink shared channel (PDSCH) based on the TBS.

Example 17 includes an evolved node B (eNB) comprising: communication circuitry to determine downlink control information (DCI) is to be sent in a DCI format 1A message and cyclic redundancy check (CRC) is to be scrambled by a paging radio network temporary identifier (P-RNTI), system information radio network temporary identifier (SI-RNTI), or random access radio network temporary identifier (RA-RNTI); restrict a transmit block size (TBS) to a value located in rows 0 through 26 of a TBS table based on said determination that the DCI is to be sent in the DCI format 1A message and the CRC is to be scrambled by the P-RNTI, SI-RNTI, or RA-RNTI; and generate the DCI format 1A message with an indication of the TBS; and a radio frequency (RF) front end, coupled with the communication circuitry, to transmit the DCI format 1A message.

Example 18 includes the eNB of example 17, wherein the communication circuitry is to generate a physical downlink control channel (PDCCH) transmission to include the DCI format 1A message and the RF front end is to transmit the PDCCH transmission.

Example 19 includes the eNB of any of examples 17-18, wherein the communication circuitry is further to generate a physical downlink shared channel (PDSCH) transmission with transmit blocks of the TBS and the RF front end is to transmit the PDSCH transmission.

Example 20 includes the eNB of any of examples 17-19, wherein the communication circuitry is to generate a downlink transmission using 256-quadrature amplitude modulation.

Example 21 includes the eNB of any of examples 17-20, wherein the indication is a modulation and coding scheme (MCS) index that corresponds to one of the rows 0 through 26 of the TBS table.

Example 22 includes the eNB of any of examples 17-21, further comprising an interface to facilitate communication with an Ethernet network.

Example 23 includes the eNB of any of examples 17-22 example, wherein the DCI is first DCI, the TBS is a first TBS, and the communication circuitry is to: determine second DCI is to be transmitted to a UE capable of processing a 256-quadrature amplitude modulation (QAM) transmission; and generate the second DCI with an indication of a second TBS that is a value located in a row of the TBS table that is greater than 26

Example 24 includes an apparatus comprising: means for determining whether a cyclic-redundancy check (CRC) corresponding to downlink control information (DCI) is scrambled by a paging radio network temporary identifier (P-RNTI), a system information radio network temporary identifier (SI-RNTI), or a random access radio network temporary identifier (RA-RNTI); means for determining a row of a transmit block size (TBS) table referenced by the DCI; and means for determining whether to use the DCI or discard the DCI based on said determining of whether the CRC is scrambled by a P-RNTI, SI-RNTI, or RA-RNTI and said determining of the row of the TBS table referenced by the DCI.

Example 25 includes the apparatus of example 24, wherein determining whether to use the DCI or discard the DCI comprises: if the CRC is scrambled by P-RNTI, SI-RNTI, or RA-RNTI and the row is less than or equal to 26, using the DCI to select a TBS; and if the CRC is scrambled by P-RNTI, SI-RNTI, or RA-RNTI and the row is greater than 26, discarding the DCI.

Example 26 includes the apparatus of any of examples 24-25, further comprising: means for determining a modulation and coding scheme (MCS) index based on the DCI; means for setting a TBS index equal to the MCS index; and means for determining the row of the TBS table based on the TBS index.

Example 27 includes the apparatus of any of examples 24-26, further comprising: means for setting a column indicator equal to 2 if a least significant bit (LSB) of a transmit power control (TPC) command is 0 and setting the column indicator equal to 3 if the LSB of the TPC command is not equal to zero; and means for selecting a TBS from the row based on the column indicator.

Example 28 includes the apparatus of any of examples 24-27, further comprising: means for processing a physical downlink shared channel (PDSCH) based on the TBS.

Example 29 includes a method of transmitting a downlink transmission, the method comprising: determining downlink control information (DCI) is to be sent in a DCI format 1A message and cyclic redundancy check (CRC) is to be scrambled by a paging radio network temporary identifier (P-RNTI), system information radio network temporary identifier (SI-RNTI), or random access radio network temporary identifier (RA-RNTI); restricting a transmit block size (TBS) to a value located in rows 0 through 26 of a TBS table based on said determination that the DCI is to be sent in the DCI format 1A message and the CRC is to be scrambled by the P-RNTI, SI-RNTI, or RA-RNTI; and generating the DCI format 1A message with an indication of the TBS; and transmitting the DCI format 1A message.

Example 30 includes the method of example 29, further comprising: generating a physical downlink control channel (PDCCH) transmission to include the DCI format 1A message; and transmitting the PDCCH transmission.

Example 31 includes the method of any of examples 29-30, further comprising: generating a physical downlink shared channel (PDSCH) transmission with transmit blocks of the TBS; and transmitting the PDSCH transmission.

Example 32 includes the method of any of examples 29-31, further comprising: generating a downlink transmission using 256-quadrature amplitude modulation.

Example 33 includes the method of any of examples 29-31, wherein the indication is a modulation and coding scheme (MCS) index that corresponds to one of the rows 0 through 26 of the TBS table.

Example 34 includes an apparatus configured to perform the method of any of examples 29-33.

Example 35 includes one or more non-transitory, computer-readable media having instructions that, when executed, cause an evolved node B (eNB) to: determine downlink control information (DCI) is to be sent in a DCI format 1A message and cyclic redundancy check (CRC) is to be scrambled by a paging radio network temporary identifier (P-RNTI), system information radio network temporary identifier (SI-RNTI), or random access radio network temporary identifier (RA-RNTI); restrict a transmit block size (TBS) to a value located in rows 0 through 26 of a TBS table based on said determination that the DCI is to be sent in the DCI format 1A message and the CRC is to be scrambled by the P-RNTI, SI-RNTI, or RA-RNTI; and generate the DCI format 1A message with an indication of the TBS.

Example 36 includes the one or more non-transitory, computer-readable media of example 35, wherein the instructions, when executed, further cause the eNB to: generate a physical downlink control channel (PDCCH) transmission to include the DCI format 1A message; and transmit the PDCCH transmission.

Example 37 includes the one or more non-transitory, computer-readable media of any of examples 35-36, wherein the instructions, when executed, further cause the eNB to: generate a physical downlink shared channel (PDSCH) transmission with transmit blocks of the TBS; and transmit the PDSCH transmission.

Example 38 includes the one or more non-transitory, computer-readable media of any of examples 35-37, wherein the instructions, when executed, further cause the eNB to: generate a downlink transmission using 256-quadrature amplitude modulation.

Example 39 includes the one or more non-transitory, computer-readable media of any of examples 35-38, wherein the indication is a modulation and coding scheme (MCS) index that corresponds to one of the rows 0 through 26 of the TBS table.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. One or more non-transitory computer-readable media having instructions that, when executed by a user equipment (UE) that is configured to process a 256-quadrature amplitude modulation (QAM) transmission, cause the UE to:

receive downlink control information (DCI) from an evolved node B (eNB), wherein the DCI references a row of a transport block size (TB S) table, the row being greater than 26 and associated to 256-QAM;

determine whether or not the DCI received from the eNB has a DCI format 1A with a cyclic-redundancy check (CRC) scrambled by a paging radio network temporary identifier (P-RNTI), a system information radio network temporary identifier (SI-RNTI), or a random access radio network temporary identifier (RA-RNTI);

if so, discard the DCI based on the row, referenced in the DCI, being greater than 26; and if not, utilize the DCI to determine a TBS based on the TBS table.

2. The one or more non-transitory, computer-readable media of claim 1, wherein the instructions, when executed, cause the UE to determine the TBS based on a TBS index by reference to a stored TBS table.

3. The one or more non-transitory, computer-readable media of claim 2, wherein the instructions, when executed, cause the UE to:

set a column indicator equal to 2 if a least significant bit (LSB) of a transmit power control (TPC) command is 0 and set the column indicator equal to 3 if the LSB of the TPC command is not equal to zero; and determine the TBS based further on the column indicator.

4. The one or more non-transitory computer-readable media of claim 1, wherein the instructions, when executed, cause the UE to:

determine a modulation and coding scheme (MCS) index based on the DCI; and set a TBS index equal to the MCS index.

5. A user equipment (UE) that is configured to process a 256-quadrature amplitude modulation (QAM) transmission, comprising:

a radio frequency (RF) front end to facilitate wireless communication with an evolved node B (eNB); and communication circuitry coupled with the RF front end to:

receive downlink control information (DCI) from an eNB via the RF front end, wherein the DCI references a row of a transport block size (TBS) table, the row being greater than 26 and associated to 256-QAM;

determine whether or not the DCI received from the eNB has a DCI format 1A with a cyclic-redundancy check (CRC) scrambled by a paging radio network temporary identifier (P-RNTI), a system information radio network temporary identifier (SI-RNTI), or a random access radio network temporary identifier (RA-RNTI);

if so, discard the DCI based on the row, referenced in the DCI, being greater than 26; and if not, utilize the DCI to determine a TBS based on the TBS table.

6. The UE of claim 5, wherein the communication circuitry is further to:

process a physical downlink shared channel (PDSCH) transmission based on the TBS.

7. The UE of claim 5, wherein the communication circuitry is further to:

determine a modulation and coding scheme (MCS) index based on the DCI; and set a TBS index equal to the MCS index.

8. The UE of claim 5, wherein the communication circuitry is to determine the TBS based on the TBS index by reference to a stored TBS table.

9. The UE of claim 8, wherein the communication circuitry is further to:

set a column indicator equal to 2 if a least significant bit (LSB) of a transmit power control (TPC) command is 0 and set the column indicator equal to 3 if the LSB of the TPC command is not equal to zero; and determine a column of the TBS table based on the column indicator.

10. A method to be performed by a user equipment (UE) that is configured to process a 256-quadrature amplitude modulation (QAM) transmission, wherein the method comprises:

receiving downlink control information (DCI) from an evolved Node B (eNB), wherein the DCI references a row of a transport block size (TBS) table, the row being greater than 26 and associated to 256-QAM;

determining whether or not the DCI received from the eNB has DCI format 1A with a cyclic-redundancy check (CRC) scrambled by a paging radio network temporary identifier (P-RNTI), a system information radio network temporary identifier (SI-RNTI), or a random access radio network temporary identifier (RA-RNTI);

if so, discarding the DCI based on the row, referenced in the DCI, being greater than 26; and if not, utilizing the DCI to determine a TBS based on the TBS table.

11. The method of claim 10, further comprising:

determining a modulation and coding scheme (MCS) index based on the DCI; and setting a TBS index equal to the MCS index.

12. The method of claim 10, wherein determining the TBS based on the TBS table includes determining the TBS based on a TBS index by reference to a stored TBS table.

13. The method of claim 12, further comprising:

setting a column indicator equal to 2 if a least significant bit (LSB) of a transmit power control (TPC) command is 0 and setting the column indicator equal to 3 if the LSB of the TPC command is not equal to zero; and determining the TBS based further on the column indicator.

* * * * *

UNITED STATES PATENT AND TRADEMARK OFFICE
CERTIFICATE OF CORRECTION

PATENT NO. : 10,411,828 B2
APPLICATION NO. : 14/581619
DATED : September 10, 2019
INVENTOR(S) : Seunghee Han et al.

Page 1 of 1

It is certified that error appears in the above-identified patent and that said Letters Patent is hereby corrected as shown below:

In the Claims

Column 15
Line 3, Claim 1 remove the space between the "B" and "S" in (TB S).

Signed and Sealed this
Twelfth Day of November, 2019

Andrei Iancu
*Director of the United States Patent and Trademark Office*